United States Patent [19]

Hemmings

[11] Patent Number: 5,184,926
[45] Date of Patent: Feb. 9, 1993

[54] ROOT-STRENGTH DRILL BIT AND METHOD OF MAKING

[75] Inventor: David T. Hemmings, Orange, Calif.

[73] Assignee: Megatool, Inc., Calif.

[21] Appl. No.: 609,429

[22] Filed: Nov. 5, 1990

[51] Int. Cl.⁵ .............................................. B23B 51/02
[52] U.S. Cl. .................................... 408/226; 408/230; 408/704
[58] Field of Search ............... 408/230, 118, 202, 201, 408/226, 715, 227, 229, 704

[56] References Cited

U.S. PATENT DOCUMENTS

| | | | |
|---|---|---|---|
| 2,775,148 | 12/1956 | Campbell | 408/118 X |
| 2,794,470 | 6/1957 | Wright | 408/202 X |
| 2,897,695 | 8/1959 | Winslow | 408/715 X |
| 3,564,948 | 2/1971 | Pomernacki | 408/226 X |
| 4,536,108 | 8/1985 | Saxton et al. | 408/226 X |
| 4,555,204 | 11/1985 | Cassidenti | 408/230 X |
| 4,580,933 | 4/1986 | Wilkins | 408/118 |
| 4,962,820 | 10/1990 | Fischer | 408/72 R X |
| 5,031,709 | 7/1991 | Fischer | 408/80 X |

FOREIGN PATENT DOCUMENTS

| | | | |
|---|---|---|---|
| 140910 | 6/1989 | Japan | 408/230 |
| 146606 | 6/1989 | Japan | 408/230 |
| 1357151 | 12/1987 | U.S.S.R. | 408/230 |

*Primary Examiner*—Steven C. Bishop
*Attorney, Agent, or Firm*—William L. Chapin

[57] ABSTRACT

An improved drill bit having a shank of larger diameter than the body of the drill has an intermediate section rearward of the point section of the drill of smaller diameter than the point, and a longitudinally elongated, enlarged diameter root section joining the rear end of the intermediate section to the shank. The reduced diameter of the intermediate section provides a clearance space, preventing rubbing of the wall of a hole drilled by the bit, while the enlarged diameter root section increases the resistance of the bit to breaking. An improved method of making the enlarged-root drill bit includes inclining a relieving wheel at a substantially smaller angle to the longitudinal axis of a blank than the angle at which the blank was fluted. In one embodiment having a front tapered tip made by the novel method, rearwardly directed teeth are formed at the rear plane of the drill point, by fluting and relieving steps alone, without requiring an additional machining step.

16 Claims, 3 Drawing Sheets

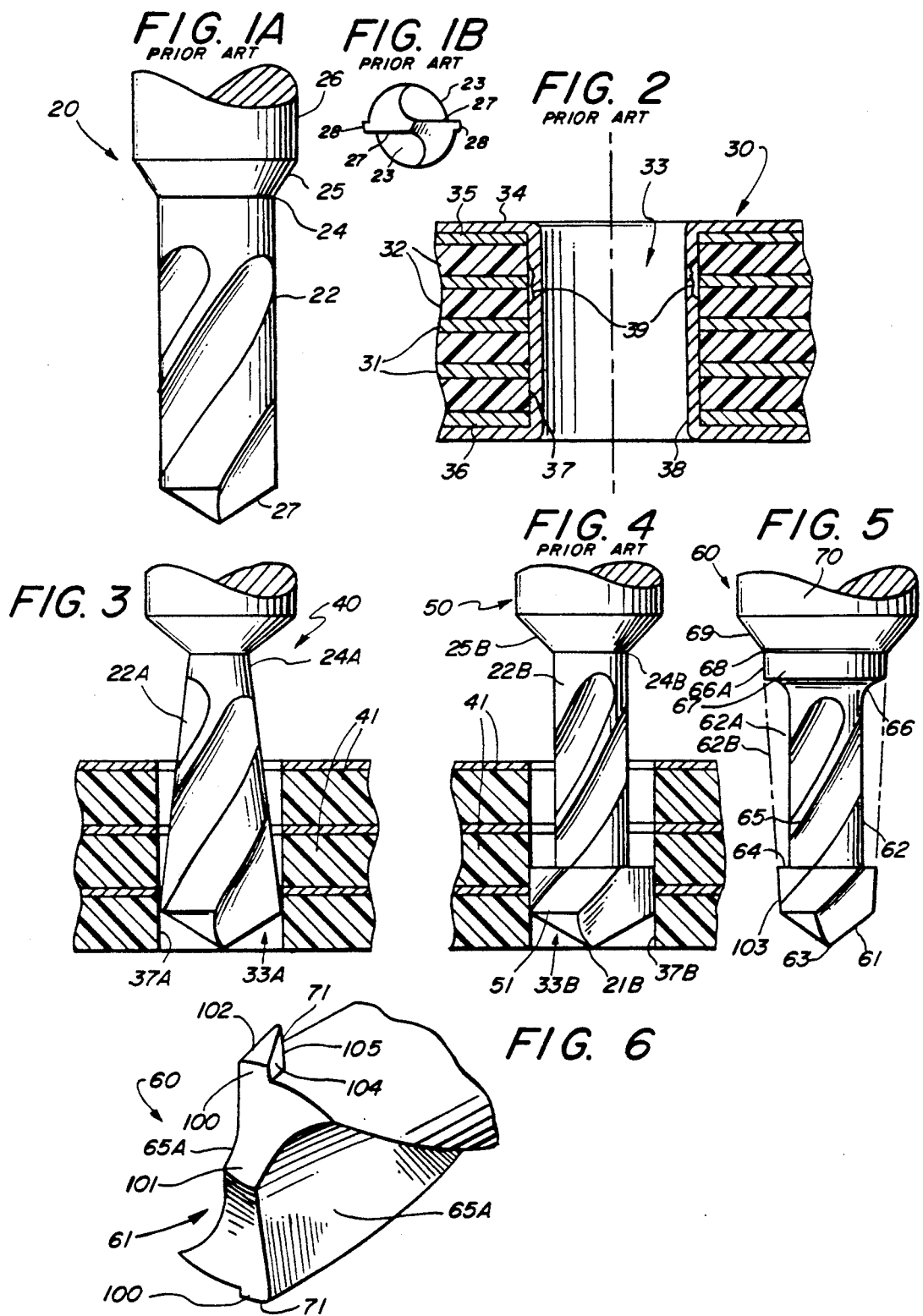

ROOT-STRENGTH DRILL BIT AND METHOD OF MAKING

BACKGROUND OF THE INVENTION

1. Field of the Invention

This invention relates to twist drills and methods for their manufacture. More particularly, the invention relates to an improved type of drill bit, and to a novel method for making the improved drill.

2. Description of Background Art

Twist drills in a wide range of sizes have long been used in the fabrication of a large variety of manufactured products. One industry which now employs prodigious quantities of twist drill bits, or drills, is the electronics industry. The drills are used chiefly to make holes in printed circuit through which the leads of electronic components are inserted. Typical printed circuit boards used in relatively simple consumer electronic equipment may require the drilling of 100 to 5,000 holes, in sizes ranging from 0.004 inch to 0.250 inch in diameter. More complex consumer electronic equipment, and industrial and military electronics apparatus, may employ many printed circuit boards, some of which may require drilling as many as 50,000 holes of various sizes through the board.

The drilling of printed circuit boards imposes some rather special demands on drill bits used for that purpose.

First, the small size of the holes which must be drilled in printed circuit boards requires that drills as small as 0.004 inch in diameter be used to make the holes. Thus, even when made of a high strength material such as steel or carbide, drills of such small diameter tend to break relatively easily. The costs of purchasing replacement bits and the additional costs resulting from production down-time for drill replacement, could be reduced if breakage of small drill bits could be made infrequent. A second demand placed on drills used in the manufacture of printed circuit boards arises from the nature of the materials used to fabricate the boards. A significant percentage of printed circuit boards is fabricated from a composite material. For example, some printed circuit boards are made of thermosetting resin such as expoxy, in which glass fibers are imbedded. The glass fibers are hard and abrasive. Thus, drills intended for use with such printed circuit boards must be made from a very hard material, such as high-carbon steel, or carbide. Otherwise, the drills would dull quickly, requiring excessively frequent replacement or re-sharpening.

Manufacturing drill bits from a hard or refractory material such as high-carbon steel or tungsten carbide solves the problem of providing a drill which can form an acceptable number of holes in fiberglass-expoxy printed circuit boards before requiring re-sharpening. However, varying the composition of the drill to make it harder has the undesirable side effect of making the drill more brittle, at least with any presently known materials. Thus, making a drill harder to avoid premature dulling makes the drill more susceptible to breakage.

A third demand placed on drills used for printed circuit board fabrication arises from another characteristic of i the materials from which printed circuit boards are made. The frictional heat generated by the drilling process is often sufficient to melt some of the resin matrix of a printed circuit board. The melted resin has a tendency to flow radially inwards into a freshly drilled hole, a problem referred to as "resin smear." Then, if a drill bit having a uniform body diameter, or one which tapers to a somewhat smaller body diameter near the front edge or cutting lip of the drill, is withdrawn from the hole, the body of the drill rubs the wall surrounding the hole. Rubbing the hole wall during drill withdrawal can cause the hole diameter to be non-uniform, and can also result in broken drill bits and additional wall heating and resin smear.

To prevent side wall rubbing, most drill bits used in the printed circuit board industry are "back tapered." In a back tapered drill, the body of the drill tapers rearward to a small diameter "root", i.e., junction with larger diameter shank which is held in the chuck of the drilling machine. But the smaller diameter of the root makes the drill more susceptible to breakage at that point.

Some printed circuit board drills are undercut to provide a space or relief between the body of the drill and the wall of a newly drilled hole. In an undercut drill, a substantial portion of the length of the body of the drill rearward of the tip is of smaller diameter than the tip of the drill. Again, the reduced diameter root of such undercut drills makes them more susceptible to breakage than drills which are front tapered, or are of uniform diameter.

Jeremias, in U.S. Pat. No. 4,480,952, Nov. 6, 1984, Non-burring Drill For Composite Materials, discloses a drill having a pointed blade-like tip portion extending forward from a cylindrical base having the same diameter as the shank of the drill. An annular groove rearward of the base having transverse forward and rearward wall surfaces forms therewith a right angled, circular cutting edge. The blade-like tip portion is provided for initiating a hole in a composite workpiece. The circular, rear facing cutting edge is provided for removing fibers projecting from the walls of the hole upon retracting the drill through the hole. Neither the Jeremias patent, nor any other prior art which the present inventor is aware of, discloses a drill bit for printed circuit boards which provides a satisfactory solution to the problems described in the previous paragraphs.

OBJECTS OF THE INVENTION

An object of the present invention is to provide an improved drill bit, or drill, of increased root strength, thereby making the drill more resistant to breakage.

Another object of the invention is to provide an improved drill in which the body of the drill tapers rearward to a larger diameter, longitudinally elongated root section at the junction of the body with the shank, and which also tapers forward to a larger diameter tip, thereby locating the smallest diameter portion of the drill intermediate the root section and the tip.

Another object of the invention is to provide an improved drill having a reduced diameter body to minimize hole-rubbing or withdrawal, yet having an enlarged diameter root section which affords greater strength.

Another object of the invention is to provide an improved drill having a front tapered rear root section, and a front-tapered, undercut tip.

Another object of the invention is to provide a method for manufacturing a drill having a body which tapers to a smaller diameter progressing rearward from the tip, and thence to a larger diameter rearward to the root.

Another object of the invention is to provide a method for manufacturing a drill having a front tapered tip, a reduced diameter intermediate body portion, a front tapered root section, and an undercut, reverse cutting tip, in which a separate undercutting step is not required.

Another object of the invention is to provide a drill having a back tapered tip, a body rearward of the tip which tapers rearward to a minimum diameter and thence tapers rearward to a larger diameter, forward-tapered root section, and a method for making same.

Various other objects and advantages of the present invention, and its most novel features, will become apparent to those skilled in the art by perusing the accompanying specifications, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an improved drill bit, or drill, and a novel method of making the drill. While the drill is intended to overcome certain problems encountered in drilling printed circuit boards and other composite materials, the drill and method of making have a wider utility which will be apparent to those skilled in the art.

A major structural feature of the novel drill according to the present invention is a body section which has a reduced diameter intermediate portion which tapers positively to a large diameter, longitudinally elongated portion, or root section, forward of the root. The larger diameter root section improves the breakage resistance of the drill, while the reduced diameter of the intermediate section permits the drill to be withdrawn from a drilled hole without scuffing or rubbing the wall surrounding the hole. In preferred embodiments of the drill according to the present invention, the intermediate section of the body is of uniform diameter, or tapers rearward negatively a slight amount, to a minimum diameter neck intermediate the tip and root section of the drill, and then tapers rearward positively to join the larger diameter root section.

The novel method for making improved drills according to the present invention utilizes fluting and relieving wheels that are inclined at different angles to a drill bit blank. In prior art drill fabrication methods, a cylindrical blank is rotated about its own axis at a rate of about 1 rpm, while being ground by a circular fluting wheel whose rotational axis is inclined to the longitudinal axis of the blank. While the fluting wheel is being driven about its own axis at a relatively high speed of 3,500 rpm. to 5,000 rpm., it is simultaneously advanced along a line parallel to the longitudinal axis of the blank at a linear speed of approximately 1 to 2 inches per minute. Linear movement of the fluting wheel begins at the tip and advances rearward towards the shank of the drill. Linear motion of the fluting wheel parallel to the longitudinal axis of the drill blank, in combination with rotation of the blank about its own longitudinal axis, results in a helically disposed spiral groove or flute being formed in the body of a drill blank. The ratio between the angular rotation rate of the blank about its axis to the linear speed of the fluting wheel relative to the blank, is chosen to yield the desired helix angle. Typically, two diametrically opposed helical flutes are cut in the cylindrical wall surface of the drill blank in two separate cutting steps.

A helical band defined at one side by an edge of a helical flute, and at another side by a parallel line lying in the uncut cylindrical body of the drill blank a short distance inwards from the intersection of the flute with the uncut body, is referred to as the margin of the drill. A two-fluted drill will of course have two such margins.

In conventional drill manufacturing methods, portions of the drill body initially uncut during the fluting operation and lying between margins are ground to a smaller diameter by a relieving wheel. The difference between the smaller diameter relieved portions and the uncut margins is referred to as body clearance, and is provided to reduce wall rubbing.

In conventional drill fabrication methods, the rotational axis of the relieving wheel is typically inclined at a very slightly smaller angle to the longitudinal axis of the drill blank than was the inclination of the fluting wheel. Thus, while a typical fluting wheel inclination might be 35 degrees, the inclination of the relieving wheel might be 30 degrees to 35 degrees.

In the novel drill bit manufacturing method according to the present invention, the relieving wheel is inclined at a substantially smaller angle than the fluting wheel angle. Thus, if the fluting wheel inclination were 35 degrees, the relieving wheel inclination according to the present invention would be 20 to 25 degrees. This novel reduction in relieving wheel inclination relative to fluting wheel inclination results in the formation of a drill having an undercut intermediate portion rearward of the tip, and two sharp, rearwardly directed pyramidally shaped cutting teeth, one extending rearward from the intersection of each margin with the conically-shaped front point surface.

BRIEF DESCRIPTION OF THE DRAWINGS

FIG. 1A is a side elevation view of a conventional prior art drill bit having a front-tapered transition section between its root and shank, and a front-tapered tip (FT/FT).

FIG. 1B is a front end elevational view of the drill bit of FIG. 1A.

FIG. 2 is a sectional view of a multi-layer printed circuit board which has been drilled by a bit of the type shown in FIG. 1, showing how resin used to fabricate the board may melt and block conductive paths when so drilled.

FIG. 3 is a partly sectional view of a prior art drill bit having a front tapered transition section rearward of its root, and back tapered tip (FT/BT), showing the bit being used to drill a stack of single layer printed circuit boards.

FIG. 4 is a partly sectional view of a prior art drill bit having a front tapered transition section and an undercut tip being used to drill printed circuit boards of the type shown in FIG. 3.

FIG. 5 is a side elevation view of an improved front taper/front taper/undercut drill bit according to the present invention, having a longitudinally elongated root section.

FIG. 6 is a front perspective view of the FT/FT/UC drill bit of FIG. 5.

DETAILED DESCRIPTION OF THE INVENTION

Figure 7A:
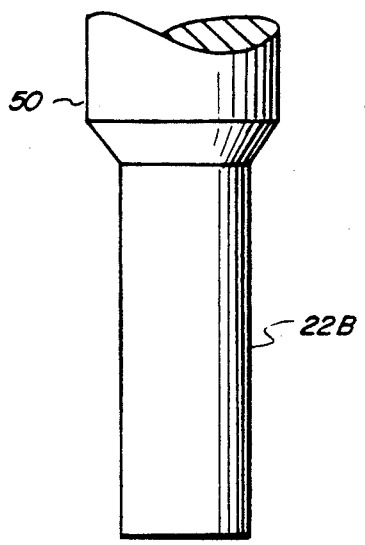
FIGS. 7A, 7B and 7C illustrate steps in the manufacture of a conventional prior art undercut drill bit of the type shown in FIG. 4.

Referring now to FIG. 1, a conventional prior art drill bit is shown to facilitate a description of the difference between the present invention and the prior art.

As shown in FIGS. 1A and 1B, a typical prior art drill bit 20 has a front tapered, conically shaped point 21, a body 22 of generally uniform diameter, and two spiral or helically disposed flutes 23 cut in the cylindrical wall surface of the body and extending longitudinally rearward from point 21 to a location slightly forward of a circular transverse plane referred to as a root 24. Body 22 tapers radially outward in a frusto-conically shaped transition section that extends rearward from root 24 to join a shank 26 of larger diameter than body 22.

As shown in FIG. 1B, two lips or cutting edges 27 are formed in point 21. Margins 28 are formed at junctions between tip 27 and the cylindrical wall of body 22, by grinding or relieving the body.

FIG. 2 illustrates a problem encountered in drilling multi-layer printed circuit boards with conventional drills of the type shown in FIG. 1.

As shown in FIG. 2, a multi-layer printed circuit board 30 consists of copper-foil conducting layers 31 sandwiched between insulating layers 32 of fiberglass-filled expoxy resin. Subsequent to the drilling of a hole 33, a layer of copper 34 is deposited on either or both upper and lower board surfaces 35 and 36, respectively. Copper layer 34 is also deposited on the inner cylindrical wall surface 37 of hole 33. Thus formed, copper layer 34 has the shape of an eyelet which forms a conducting path, or "VIA" 38 between various conducting layers 31 of the PC board 30.

As shown in FIG. 2, blobs of melted resin 39 can sometimes form in wall 37 of a hole 33 drilled with a conventional FT/FT drill of the type shown in FIG. 1. Then, when copper layer 34 is deposited in hole 33, resin blobs 39 can block electrical conduction between one or more layers 31 and the eyelet 38. Usually, the existence of such resin barriers is not revealed until electrical continuity tests are performed subsequent to the plating process, necessitating costly re-work of a board 30.

One solution to the problem described above is to use a drill having a front-tapered rear transition section, and a back-tapered tip, i.e., an FT/BT drill. An FT/BT drill 40 is shown in FIG. 3 being used to drill a stack of printed circuit boards 41, which may be single layer or multi-layer boards. The back-tapered body 22A of drill 40 decreases the length of body that contacts wall surface 37A of hole 33A. Thus, less rubbing of surface 37A occurs upon withdrawal of FT/BT drill 40 from hole 33. This is desirable because less rubbing generates less heat and therefore less resin smear.

Another prior art approach to reducing wall rubbing during drill withdrawal is shown in FIG. 4. In FIG. 4, an undercut drill 50 is shown drilling a stack of PC boards 41. Undercut drill 40 has a front cylindrical body section 51 of uniform diameter extending rearward a short distance from point 21B. Rearward of front section 51, body 22B of drill 50 is undercut to a smaller diameter, which is uniform over the longitudinal span of the body rearward to its intersection with transition section 25B at root 24B. Since only the relatively short front body section 51 of undercut drill 50 contacts wall surface 37B of hole 33B upon withdrawal, wall rubbing is again reduced.

As pointed out above, front tapered/back tapered (FT/BT) drill 40 of FIG. 3, and undercut (FT/UC) drill 50 of FIG. 4 both provide reduced hole-wall rubbing, as compared to front tapered (FT/FT) drill 20 of FIG. 1. However, both of the latter two drill bits have roots 24A and 24B which are of smaller diameter than that of root 24 of an FT/FT drill for the same size hole. Thus, prior art drills shaped to reduce wall rubbing are inherently weaker, and therefore more susceptible to breakage, than front tapered drills. Also, prior art drills of the type shown in FIGS. 3 and 4 and described above do not fully solve the problem of melted resin blocking conducting paths in multi-layer boards.

With the limitations of prior art drills of the type described above in mind, the novel drill according to the present invention and depicted in FIGS. 5 and 6 was conceived of.

As shown in FIGS. 5 and 6, one embodiment 60 of a novel drill according to the present invention has a conically shaped point 61, and a body 62 which may be viewed as having been formed from a front tapered cylinder or frusto-conic body 62A depicted by dashed lines 62B. A short distance rearward of tip 63 of point 61, body 62 of drill 60 is undercut by a transversely disposed, annular wall 64. Drill 40 has an intermediate section 65 of appreciable length and generally cylindrical shape which extends rearward from transverse annular rear wall 64 of point 61. Helically disposed flutes 65A are formed in the cylindrical wall surface of intermediate section 65.

The rear end of intermediate section 65 of drill 60 terminates in a junction section 66 which tapers radially outwardly in an arcuate curve to intersect a circumscribed frusto-conic surface 66A of a larger diameter than the intermediate section. The circular intersection line defined above defines the front circular boundary of a root section 67. The outer surface of root section 67 is coextensive with the frusto-conic surface 66A. The rear boundary of root section 67 is defined by a circular intersection line 68 marking the intersection of the root section with a transition section 69. Transition section 69 is of frusto-conic shape and has an outer wall surface which tapers linearly rearward to a larger diameter shank 70.

As described above and depicted in FIGS. 5 and 6, the novel design of drill 60 permits the root section 67 of drill 60 to be of substantially larger diameter than the root of prior art drills of the proper size to drill the same size holes. Accordingly, drill 60 has substantially greater resistance to breakage than prior art bits. Also, the increased diameter of root section 67 of drill 60 relative to prior art drills, and the longitudinal elongation of the root section, increases the rigidity or deflection resistance of the novel drill bit. Thus, novel drill bit 60 is less likely to wobble, and is therefore less likely to make holes which are crooked, out-of-round, or improperly sized.

As shown in FIGS. 5 and 6, the novel drill 60 according to the present invention may desirably be provided with rearwardly directed, pyramid-shaped reverse cutting teeth 71. Such cutting teeth are effective in removing resin blobs 39 of the type described above in conjunction with FIG. 2. A novel method of fabricating a novel drill bit 60, in which reverse cutting teeth 71 may be formed without requiring a separate undercutting operation, is described below.

Figure 7B:
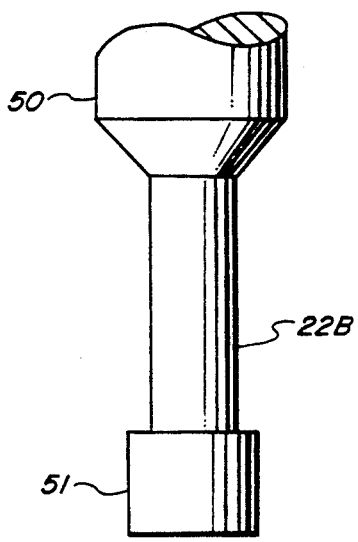
Figure 7C:
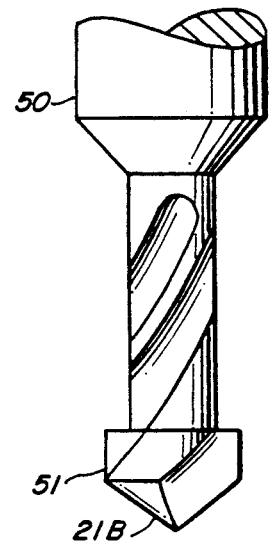

FIGS. 7A, 7B and 7C illustrate the steps required to fabricate a conventional prior art undercut drill by conventional prior art methods.

As shown in FIG. 7A, a reduced diameter body portion 22B is first ground in a length of drill rod to form a blank. Then, as shown in FIG. 7B, the blank is ground to produce a cylindrical front section 51 and a reduced diameter intermediate section. FIG. 7C illustrates an undercut drill which has been fluted and relieved in a manner to be described below, and subsequently sharpened or pointed to form point 21B.

Figure 8A:
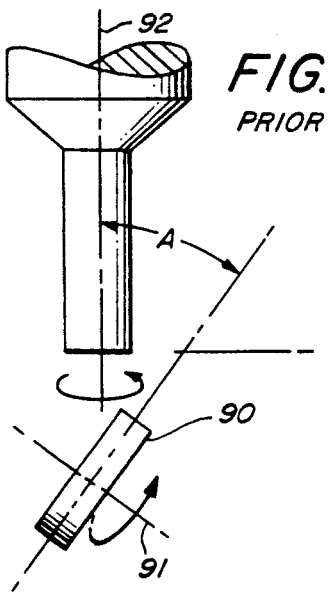
FIGS. 8A, 8B, 8C and 8D illustrate steps in fluting and relieving drill bit blanks according to the prior art.

FIGS. 8A-8D illustrate the steps in prior art methods of fluting and relieving a drill. As shown in FIG. 8A, a grinding wheel 90 rotating about its axis 91 is advanced parallel to the longitudinal axis 92 of drill blank 93, which is simultaneously rotated about its axis 92. The angle A between axis 91 of wheel 90 and axis 92 of drill blank 93 is typically 35 degrees.

Figure 8C:
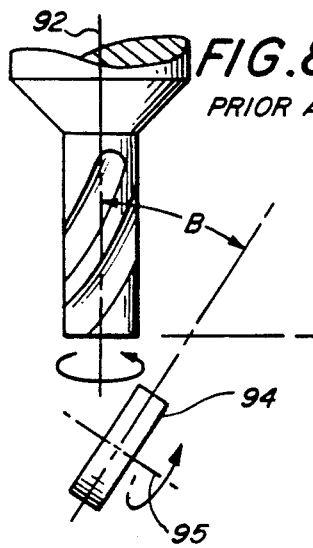
Figure 8B:
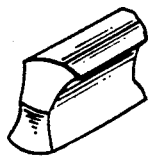
Figure 8D:
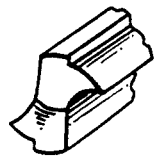

After drill blank 93 has been fluted as shown in FIG. 8B, the fluted blank is ground by a relieving wheel 94 as shown in FIG. 8C. The angle B between axis 95 of relieving wheel 94 and axis 92 of drill blank 93 is typically chosen to be slightly smaller than angle A. Thus, a typical value for angle B would be about 30 to 35 degrees. FIG. 8D illustrates the appearance of drill blank 93 which has been fluted and relieved, but not yet pointed.

FIGS. 9A-9D illustrate the steps in fluting and relieving a drill according to the novel method of the present invention.

Figure 9A:
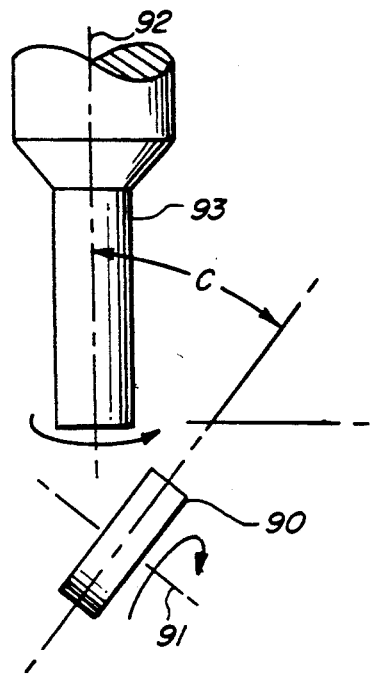
FIGS. 9A, 9B, 9C and 9D illustrate the steps in fluting and relieving a drill bit blank according to a novel method of the present invention.
Figure 9C:
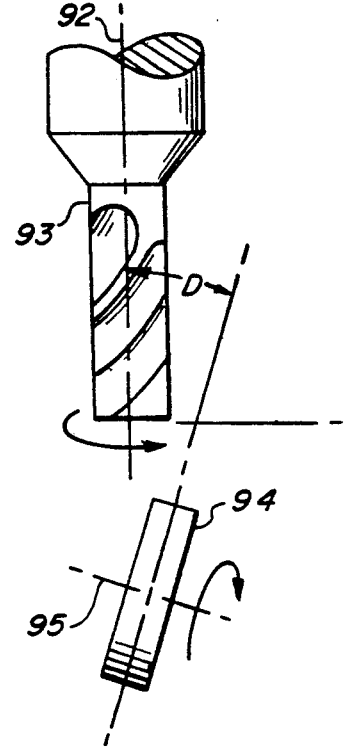
Figure 9B:
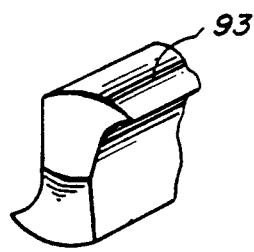
Figure 9D:

As shown in FIGS. 9A and 9B, the first step in fluting a drill according to the method of the present invention is substantially similar to the prior art method depicted in FIGS. 8A and 8B.

Thus fluting wheel 90 is inclined at an angle C of about 35 degrees ±2 degrees with respect to longitudinal axis 92 of drill blank 93.

According to the method of the present invention, relief grinding of drill blank 93 is done substantially differently from prior art relieving-wheel grinding. Thus, as shown in FIG. 9C, relieving wheel 99 is inclined at a substantially smaller angle D with respect to longitudinal axis 92 of drill blank 93. A typical value of angle D suitable for the purposes of the present invention would be about 22 degrees ±2 degrees. While the ranges for angle C and angle D stated above are believed to be optimum, it is important to note that other mean values and ranges for angles C and D may be useful, and would be within the scope of the present invention, provided angle D were appreciably different from angle C.

After a drill bit blank 93 has been fluted and relieved as depicted in FIGS. 9A-9D and described above, the front end of the drill blank is ground into a conically shaped point 61 in a conventional fashion.

FIGS. 5 and 6 show a drill bit 60 fabricated by the novel method of the present invention. As shown in those figures, the method of the present invention can produce a drill bit 60 that is not only undercut, but which also has a pair of rearwardly directed, wedge or pyramid-shaped cutting teeth 71 extending rearward from the intersection of the two diametrically opposed margins 100 with front conical surface 101 of point 61. Importantly, rear cutting teeth 71 are formed solely by the fluting and relieving steps according to the present invention, and do not require an additional machining operation. Each of the two cutting teeth 71 has an upper triangular surface 102 coextensive with the front tapered front section 103 of drill 60. Each cutting point 71 also has a pair of trapezoidal-shaped side walls 104, and a rear triangular-shaped wall 105.

Figure 10:
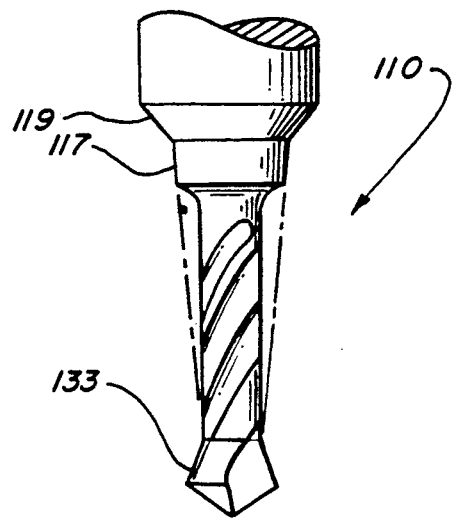
FIG. 10 illustrates a novel front taper/back taper drill bit according to the present invention, which has an increased root diameter that affords greater strength than prior art FT/BT drill bits.

FIG. 10 illustrated another embodiment 110 of an increased root-strength drill according to the present invention. Embodiment 110 is of the FT/BT variety, in which transition section 119 and root section 117 are both front tapered, while front section 133 is back tapered.

What is claimed is:

1. A fluted twist drill bit of the type having a generally cylindrical shank adapted to be clamped in a rotatable chuck, and a coaxial cutting body extending forward from said shank, said drill having improved resistance to breakage in the vicinity of the junction between said shank and said body, said drill bit comprising;
   a. a fluted cutting point at the distal end of said body,
   b. an intermediate section of smaller diameter than said cutting point extending rearward therefrom, at least a rear portion of said intermediate section being unfluted, and
   c. a longitudinally elongated, unfluted root section of larger diameter than said intermediate section extending rearward therefrom, said root section have a front-tapered front annular wall surface contiguous with the outer wall surface of said intermediate section, and
   d. A front tapered transition section joining said root section to said shank.

2. The drill bit of claim 1 wherein the maximum diameter of any portion of said body is less than the diameter of said shank.

3. The drill bit of claim 2 wherein the outer wall surface of said root section is generally frusto-conically shaped, the rear diameter of said root section being larger than the front diameter thereof.

4. The drill bit of claim 3 wherein said tapered front annular wall surface of said root section is arcuately curved.

5. The drill bit of claim 3 wherein said cutting point has a generally conical shape.

6. The drill bit of claim 5 further including a rear transition surface joining said cutting point to said intermediate section, said transition surface being reverse tapered.

7. The drill bit of claim 6 wherein said rear transition surface of said cutting point is generally frusto-conically shaped.

8. The drill bit of claim 5 wherein said cutting point is further defined as having a generally conically shaped front portion, and a frusto-conically shaped rear section having a transversely disposed rear annular wall surface joined to the front end of said intermediate section.

9. The drill bit of claim 8 wherein the cone angle of said frusto-conically shaped rear section is less than the cone angle of said front portion.

10. The drill bit of claim 9 further including a plurality of rearwardly directing cutting teeth formed in said rear section of said cutting point.

11. The drill bit of claim 10 wherein at least said cutting point is helically fluted.

12. The drill bit of claim 11 wherein each of said cutting teeth has a front wall surface coextensive with the intersection of said conical front surface of said cutting point with a margin of a helical flute of said cutting point.

13. The drill bit of claim 12 wherein said plurality is defined as two.

14. The drill bit of claim 12 wherein in upper plan view each of said cutting teeth has a generally triangular shape, the base of which is forward of a reversely-directed vertex.

15. The drill bit of claim 14 wherein the longitudinal sides of said cutting teeth are generally polygonally shaped.

16. The drill bit of claim 1 wherein said tapered transition section is further defined as being front tapered.

* * * * *